July 23, 1963 T. HAFNER 3,098,988
SUSPENSION AND TENSIONING OF SUCCESSIVE SECTIONS OF
SURFACE WAVE TRANSMISSION LINES BETWEEN SUPPORTS
WITH COUPLING BETWEEN SECTIONS AT SUPPORTS
Filed Dec. 8, 1960 2 Sheets-Sheet 1

INVENTOR.
THEODORE HAFNER
BY

INVENTOR.
THEODORE HAFNER
BY 3,098,988
Patented July 23, 1963

3,098,988

SUSPENSION AND TENSIONING OF SUCCESSIVE SECTIONS OF SURFACE WAVE TRANSMISSION LINES BETWEEN SUPPORTS WITH COUPLING BETWEEN SECTIONS AT SUPPORTS

Theodore Hafner, 265 Riverside Drive, New York, N.Y.

Filed Dec. 8, 1960, Ser. No. 74,585
4 Claims. (Cl. 333—95)

This invention relates to surface wave transmission lines and, more specifically, to the suspension of surface wave conductors on masts, poles or similar installations involving relatively large spans such as existing in high-tension power transmission lines.

One of the objects of the invention is to insure predetermined and especially minimum loss conditions by maintaining a predetermined and, if possible, a constant sag along the surface wave transmission line, especially one which is substantially independent from temperature changes.

Another object of the invention is to provide a safe and minimum loss support on large span mast installations substantially without affecting other wire installations on these masts, and compatible with existing installation practices.

A more specific object of the invention is to provide on each mast, or at least on predetermined masts located at regular intervals, tension means for the surface wave conductor and to continue the surface wave transmission line from that mast into another surface wave conductor extending to the next mast by intercoupling the two surface wave conductors along a distance which is large against operative wavelength.

Another object of the invention is to terminate a surface wave conductor on each mast or at least on a mast preceding or succeeding a predetermined number of masts, for example after a distance of one mile, and to cause this termination to extend into tensioning weights, and to continue the surface wave conductor from that mast into another surface wave conductor extending for a distance of another mile to another mast; and to intercouple these two surface wave conductors at or near the first mast, preferably in front thereof, by arranging the two surface wave conductors closely spaced to each other substantially parallelly so as to cause energy transfer from one surface wave conductor to another with a minimum loss.

As a more specific object of the invention, the two surface wave transmission lines are intercoupled by being wound around each other at a lay which is large against operating wavelength.

Alternatively such lay may be small against operating wavelength.

In another embodiment of the invention, both surface wave conductors or transmission line sections may be tensioned on one and the same mast and the intercoupling be caused by a third and separate surface wave conductor line section coupled to both these surface wave conductors or transmission line sections and being coupled to each of these surface wave transmission line sections over a distance which is large against operating wavelength.

According to a further object of the invention the coupling may consist of two surface wave transmission line sections arranged predeterminedly closely spaced from each other with insulating spacers being arranged therebetween and distributed over the coupling distance in a regular or, if necessary, in an irregular manner so as to reduce coupling loss and propagation inhomogeneity to a minimum.

These and other objects of the invention will be more fully apparent from the drawings annexed herewith in which FIG. 1 represents a portion of a mast installation embodying certain principles of the invention.

Figure 1:
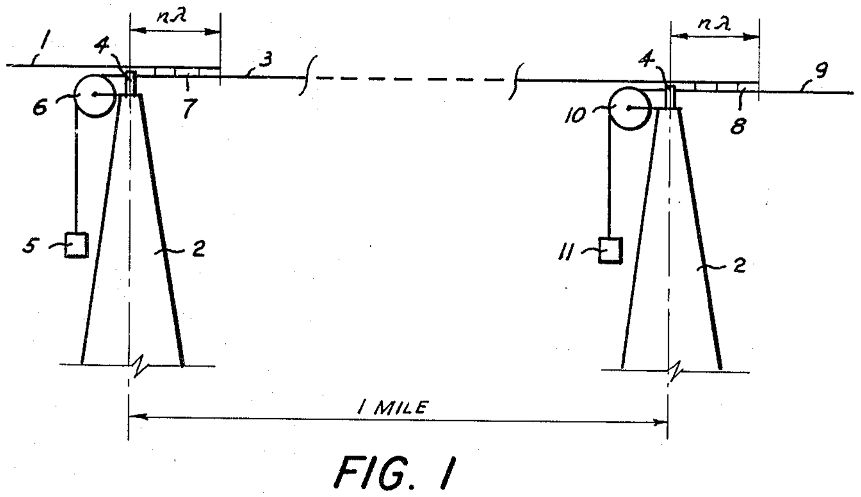

According to FIG. 1, a surface wave transmission line section is shown at 1 arriving at mast 2 where another surface wave transmission line section 3 starts which is supported on mast 2 on an insulating bracket structure 4 of minimum wave resistance to the surface wave. Surface wave transmission line section 3 is tensioned by means of weight 5 operating over roller 6, in otherwise well-known manner, to assure a predetermined sag in section 3. Sections 1 and 3 are intercoupled at 7, being arranged attached to each other parallelly or in close vicinity over a distance which is large against the operating wavelength or wavelength range of the surface wave transmission system.

Surface wave transmission line section 3 at the next following mast, or after a number of masts corresponding to a predetermined distance, is coupled at 8 in a similar manner as previously surface wave transmission line section 1, to a succeeding surface wave transmission line section 9 which is maintained predeterminedly tensioned over roller 10 by weight 11, which may or may not be equal to weight 5 depending upon the conductor length to be tensioned.

Figure 2:
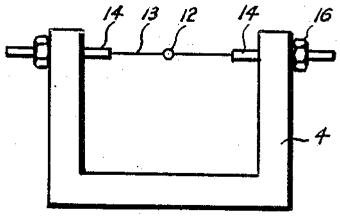
FIG. 2 shows specific haltering means on the mast.
Figure 3:
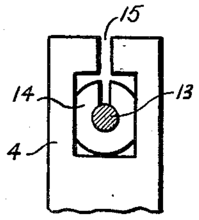
FIGS. 3 and 4 show, in side and front elevations respectively and in enlarged cross-sections, a specific attachment of a nylon string support for the surface wave conductor.

In order to facilitate tensioning and provide minimum wave resistance support, the surface wave conductor is supported, as shown in FIGS. 2 and 3, at 12 on a nylon string 13 which is held tensioned across a U-shaped Fiberglas bracket 4 rigidly mounted to the mast, as shown in FIG. 1, or in any other appropriate location.

Figure 4:
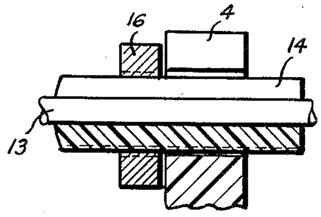

Nylon string 13, as apparent from FIGS. 3 and 4, is held tensioned by being gripped at its ends by split bolts 14 which are at least partially of square shape so as to fit non-rotatably in slots 15 provided in bracket 4. Split bolts 14 may be prethreaded or threaded by the action of nuts 16 fitting over bolts 14 and by their rotation forcing split bolts 14 to move to and fro, thereby causing nylon string 13 while being squeezed and held by split bolts 14 to be more or less tensioned. Split bolt 14 and nut 16 may be both of plastic, the same or different types of plastic, bolt 14 being preferably made of softer plastic.

Figure 5:
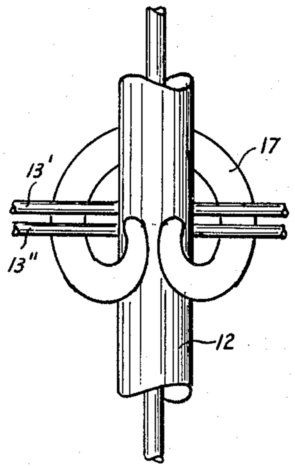
FIG. 5 shows, in an enlarged top view, a specific attachment of the surface wave conductor to nylon string.

As apparent from FIG. 5, surface wave conductor 12 may be supported on nylon string 13 (which in this embodiment is shown to consist of two separated strings 13′ and 13″) by means of a fixation disc, schematically indicated at 17, which permits surface wave conductor 12 to be quickly attached and fixed in a predetermined position across nylon string 13′, 13″.

Figure 6:
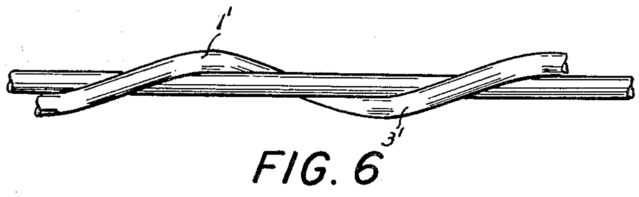
FIGS. 6 and 7 show different types of coupling between surface wave line sections.

The intercoupling between successive surface wave transmission line sections or conductors can be made in any appropriate manner, for example as shown in FIG. 6 by winding one section 1′ over the next conductor section 3′ over a sufficient distance and at a sufficient lay to assure effective coupling, minimum wave resistance and mechanical rigidity and friction adherence.

Figure 7:
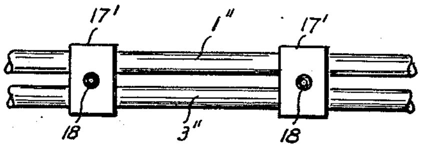
Figure 8:
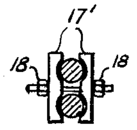
FIG. 8 represents a side view of FIG. 7 in crosssection.

In FIGS. 7 and 8, two surface wave transmission line sections 1″ and 3″ are shown to be intercoupled and attached to each other by dielectric spacers schematically indicated interconnected by metallic or nylon screw bolt attachments schematically shown at 18. Distance, dimensions and material of spacer arrangements 17', 18 are determined by the properties of surface wave transmission.

Figure 9:
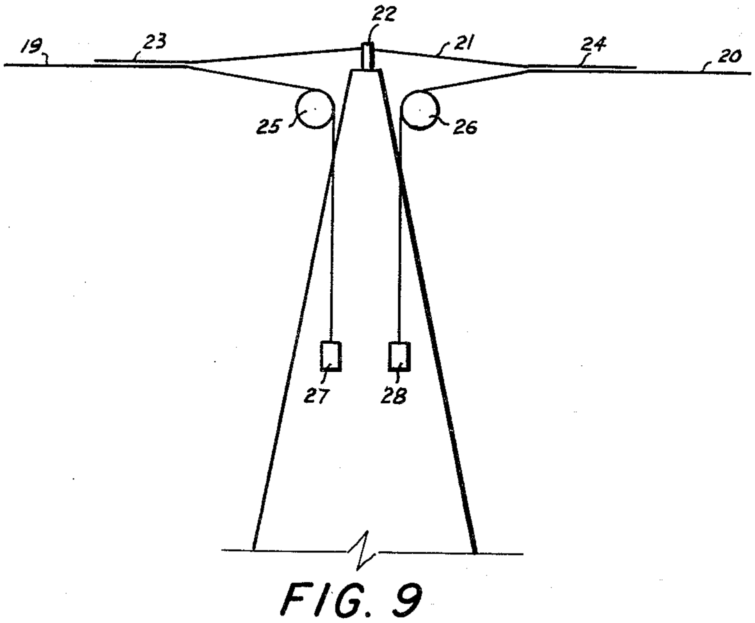
FIGS. 9 and 10 represent modifications of FIG. 1, and FIG. 11 a top view of FIG. 10.
Figure 10:
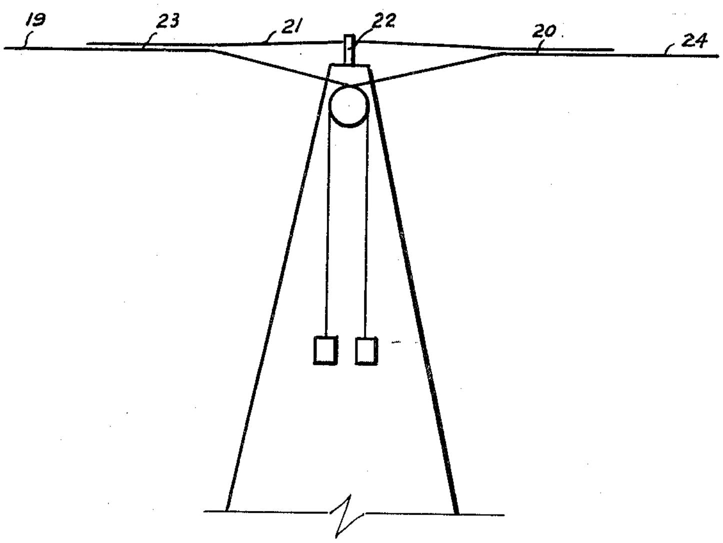
Figure 11:
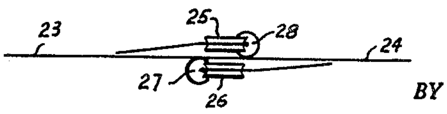

In the modification of FIGS. 9, and 10–11, intercoupling of two succeeding surface wave transmission line sections, schematically shown at 19, 20, is effected by an additional surface wave transmission line section 21 supported on Fiberglas brackets 22, in the manner illustrated in FIGS. 2, 3, 4 and 5 or in any other appropriate manner, and coupled to sections 19, 20 at portions 23, 24, in the manner shown in FIGS. 6 or 7 and 8 or in any other appropriate manner without departing from the scope of this invention.

Tensioning of both surface wave transmission line sections 19, 20 is effected on one and the same mast by extending, according to FIG. 9, lines 19, 20 over oppositely located rollers 25, 26 to tension weights 27, 28 while, according to FIGS. 10 and 11, the rollers 25, 26 are shown juxtaposed but independently rotatable to permit tension weights 27, 28 to affect surface wave transmission line sections 19, 20 substantially independently.

While the invention has been shown and described with certain masts, mounting, tensioning means and coupling arrangements, it is not limited thereto but may be applied in any other appropriate form or manner without departing from the scope of this disclosure.

I claim:

1. In a surface wave transmission system suspended on poles spaced from each other, a first surface wave conductor suspended between successive poles, means for tensioning said first conductor at one end thereof at one of said poles and means including another surface wave conductor for continuing said first conductor from said pole to another pole including means including a second surface wave conductor tensioned at said other pole for coupling said two conductors by closely arranging these conductors in parallel to each other for a distance extending over several operative wavelengths.

2. System according to claim 1 wherein at said pole both surface wave conductors are provided with tensioning means and the two surface wave conductors are coupled by another surface wave conductor along coupling distances with said two conductors which are large against operating wavelengths.

3. System according to claim 1 wherein the coupling is produced by winding one conductor around the other.

4. System according to claim 1 wherein the coupling is produced by arranging the two conductors predeterminedly spaced from each other over said coupling distance.

References Cited in the file of this patent

UNITED STATES PATENTS

| | | |
|---|---|---|
| 1,205,281 | Sorensen | Nov. 21, 1916 |
| 1,744,091 | Wrape | Jan. 21, 1930 |
| 1,860,052 | Peterson | May 24, 1932 |
| 2,867,778 | Hafner | Jan. 6, 1959 |

FOREIGN PATENTS

| | | |
|---|---|---|
| 46,085 | France (1st addition to No. 759,140) | Feb. 15, 1936 |
| 582,240 | Canada | Sept. 1, 1959 |